Figure 1:
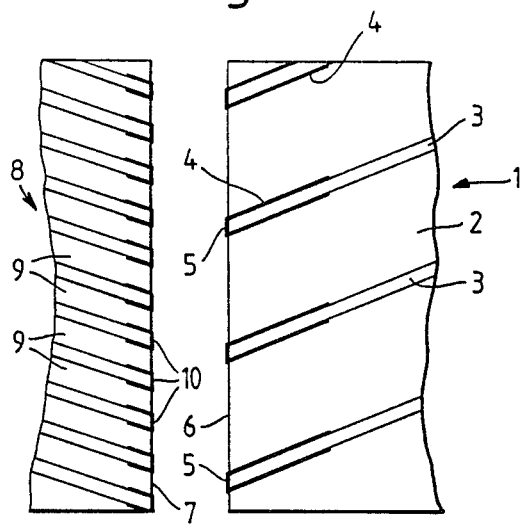

United States Patent [19]

Field et al.

[11] Patent Number: 4,886,996
[45] Date of Patent: Dec. 12, 1989

[54] CHANNEL PLATE ELECTRON MULTIPLIERS

[75] Inventors: Ronald L. Field, Woldingham; Richard S. Emptage, Mitcham, both of England

[73] Assignee: U.S. Philips Corporation, New York, N.Y.

[21] Appl. No.: 159,879

[22] Filed: Feb. 24, 1988

[30] Foreign Application Priority Data

Mar. 18, 1987 [GB] United Kingdom ............... 8706441

[51] Int. Cl.$^4$ .................. H01J 43/02; H01J 43/22; H01J 1/32
[52] U.S. Cl. ........................ 313/400; 313/105 CM; 313/534
[58] Field of Search ........ 313/105 CM, 534, 103 CM, 313/399, 400

[56] References Cited

U.S. PATENT DOCUMENTS

| 3,374,380 | 3/1968 | Goodrich | 313/105 CM X |
| 3,857,037 | 12/1974 | Tomii et al. | 313/384 X |
| 3,974,411 | 8/1976 | Faulkner et al. | 313/105 CM |
| 4,217,489 | 8/1980 | Rosier | 313/103 CM X |
| 4,714,861 | 12/1987 | Tosswill | 313/105 CM X |
| 4,760,305 | 7/1988 | Caple | 313/103 CM |

OTHER PUBLICATIONS

"Materials & Techniques for Electron Tubes", by Walter H. Kohl, Reinhold Pub. Corp., 1962, p. 418.

*Primary Examiner*—Palmer C. DeMeo

[57] ABSTRACT

A method is provided for bonding glass channel plates (1,8) together in a stack, with the channels (2) of one plate being at an angle to the channels (9) of an adjacent stack to reduce optical and ion feedback. A layer of indium (4,10) is provided on plate faces to be bonded, bonding being achieved by applying pressure and a temperature between 130° C. and 350° C. A mechanically rigid and electronically stable channel plate electron multiplier is obtained for use in particle or photon counters or in raster intensified cathode ray tubes.

6 Claims, 1 Drawing Sheet

U.S. Patent    Dec. 12, 1989    4,886,996

CHANNEL PLATE ELECTRON MULTIPLIERS

Background of the Invention

This invention relates to glass channel electron multiplier plates. More particularly it relates to a method of bonding glass channel electron multiplier plates in series, the channels of one plate opening into the channels of another plate.

It is known from British patent specification No. 1,126,088 to place two glass channel electron multiplier plates in series with the channels in one plate being at an angle to the channels of the other plate. Such a pair of channel plates is effective in suppressing ion or radiation feedback from the intensified output of the plates to the input of the plates. More than two plates may be placed in series in a stack with angles between the channels at each plate interface to further improve feedback suppression. Such a stack of channel plates may be used in image intensifiers, or in particle or photon counting apparatus or as a raster intensifier in a cathode ray picture tube.

SUMMARY OF THE INVENTION

It is an object of the invention to provide such a stack of channel plates as a rigid mechanical structure to stabilise the mechanical and electronic performance of the stack.

The invention provides a method of bonding glass channel electron multiplier plates in series, the channels of one plate opening into the channels of another plate, characterised by the steps of coating faces of the plates to be bonded together with indium, placing the faces in opposition and applying pressure therebetween while raising the temperature of the plates to between 130° C. and 350° C., and then maintaining the pressure while reducing the plate temperature to room temperature. Thus a solid structure is realised in which the relative positions of the openings of the channels in the two plates is permanently established. Nichrome electrodes are provided by evaporation on the outer faces of the resulting channel plate stack. In use a potential difference is applied between the outer faces so that, typically, a voltage of about 1000 volts is applied to each plate of the stack. The bonding layer of indium between two plates, being conducting, acts to establish an equipotential plane at each plate junction and so establishes the potential gradient along the channels.

The method may be characterised in that the indium coating is applied by evaporation from a heated indium source in a vacuum. Desirably the indium is evaporated onto the channel at an angle, for example 45 degrees, to the faceplate so that the indium penetrates about one channel diameter into each channel. By rotating the plate in its own plane during evaporation an even penetration of indium around each channel end is achieved. Reliable electrical connection is thus made to each channel.

Alternatively, the method may be characterised in that the indium coating is applied by plasma sputtering from an indium target.

The invention may be characterised in that a ring spacer is provided between the adjacent channel plates to separate them, the faces of the spacer being coated with indium and bonded to the rims of the channel plates. The effect of the separation is to improve the reception of electrons by the channels of one plate after issuing from the channels of the other plate by allowing some spread of the electrons in the separating gap.

The channel plate rims may be of solid glass to improve bonding. The spacer may be metallic or may be insulating so that a potential difference may be established across the gap created by the spacer. The ring spacer thickness is of the order several channel diameters.

A stack of glass channel electron multiplier plates bonded together by the method of the invention may be employed to intensify electron streams generated in particle counting apparatus, photon counting apparatus or in a cathode ray picture display tube employing a channel plate to intensify the display raster.

Figure 2:
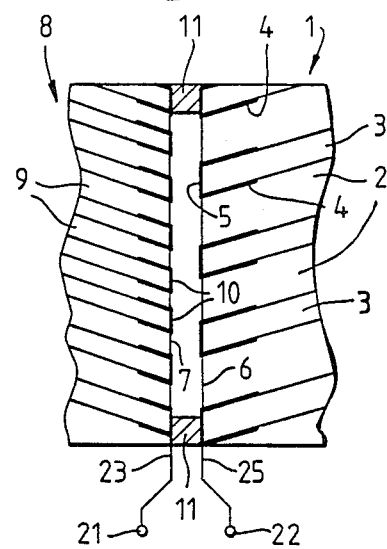
Figure 3:
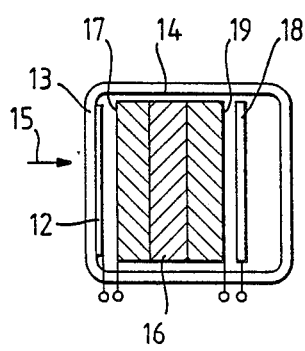
Figure 4:
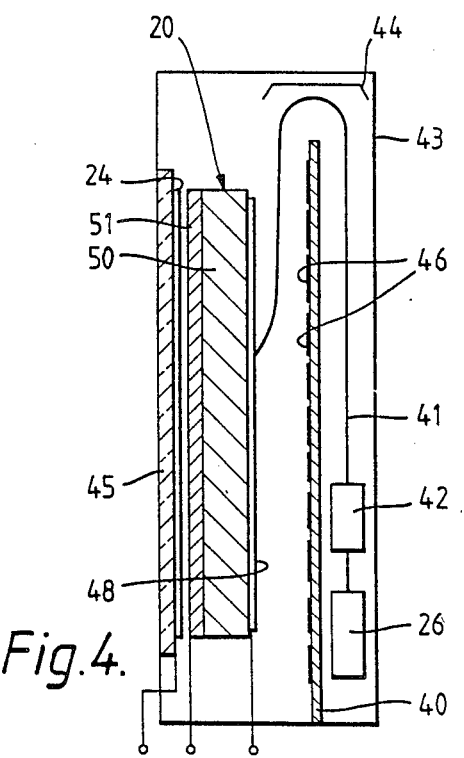

Embodiments of the method of the invention will now be described with reference to the accompanying drawing in which, FIG. 1 shows a much enlarged schematic sectional view of the faces of two channel plates to be bonded together, FIG. 2 shows two channel plates bonded together with an insulating spacer between them, FIG. 3 shows a photon counting apparatus embodying a bonded stack of channel plates, and FIG. 4 shows a sectional view of a folded electron beam cathode ray display tube employing a bonded stack of channel plates as a raster intensifier.

Referring to FIG. 1 a schematic sectional view is shown of the faces 6 and 7 of the two glass channel plates prepared for bonding. Channel plate 1 comprises channels 2 having, for example, a diameter of 100 $\mu$m. In this example, the pitch of the channels is 108 $\mu$m, the channels being stacked in a rectangular array of rows and columns. FIG. 1, therefore, does not show the larger area lands of glass between each square array of four adjacent channels. The channel plate is made by fusing together a stack of glass rods, each rod having a core glass and a surrounding cladding glass. The core glass is then etched out using an etchant to which the cladding glass is resistant. The cladding glass may include lead oxide (PbO) and a small percentage of bismuth oxide ($Bi_2O_3$) to which a hydrogen reduction process is applied at a convenient stage during plate manufacture. This produces a resistive layer on the inside walls of each channel, as described in British patent specification No. 1,168,415 (PHB31892). This resistive layer establishes a potential gradient along each channel when a potential difference is applied between the end faces, thereby providing a continuous dynode for secondary electron multiplication.

An evaporated layer 4 of indium is shown on the channel walls 3 penetrating down inside the channels and extending across the ends 5 of the channel walls in face 6. Evaporation is carried out from a source at an angle of 45 degrees to the face 6, the face 6 being rotated in its own plane, thereby ensuring that the indium penetrates about one channel diameter evenly around the inside of the channels. The thickness of indium is between 0.1 and 2 microns. Alternatively the indium layer may be applied by plasma sputtering from an indium target, which also produces even channel penetration.

In this example, the second channel plate 8 comprises channels 9 having a diameter of 25 microns and a pitch of 36 microns, the channels in this plate also being stacked in a rectangular array of rows and columns. A 1 micron indium layer 10 is evaporated onto the face 7 in the same manner as that evaporated onto face 6, penetrating about one channel diameter down inside the channels.

When faces 6 and 7 are brought together for bonding, only a small fraction of the area of each face will be involved in bonding. Contact between the faces is limited to contact between channel wall ends or between the lands of glass between each square array of four adjacent columns and other lands or channel wall ends.

Faces 6 and 7 are brought together in the horizontal plane, pressure being applied between them by means of a weight. The plates are fused together by being raised to a bonding temperature between 130° C. and 350° C. and held at this temperature under pressure for a few hours. For a bonding temperature of 350° C., the weight for a 36 mm diameter channel plate would be a few kilograms, whilst for 130° C. bonding temperature the weight for the same size plate would be about 10 to 30 kilograms. The fused plate is then cooled down to room temperature while maintaining the pressure and transferred to a vacuum chamber. Nichrome (Trade Mark) electrodes are evaporated onto the outer faces of the stack, the evaporation source being in a direction at 45 degrees to the faces and the stack being rotated to ensure even penetration of the electrode layer down each channel. The completed stack is then tested in a demountable vacuum rig using an electron flood gun to provide electron input to the input face of the stack (in this example the large diameter channels), a fluorescent screen anode being placed 1 mm from the output face to provide a picture of the output face. It is a benefit of the bonded stack that quality control can be applied to it in the knowledge that there will be no disturbance to the relative positions of the plates in later handling.

It should be noted that when the channels are of equal pitch in the two plates of the stack, alignment of the channels in the two plates is not possible, given the inevitable small variations of channel pitch across a channel plate. In most instances one first plate channel would feed electrons to more than one second plate channel.

In some applications, adjacent plates in the stack are preferred to be in contact. In this case the whole of the plate face area to be bonded is coated with indium. But in other applications a gap is preferred between adjacent plates. For this a thin ring spacer or shim may be provided between adjacent channel plates to provide the gap. The spacer may be an insulator such as quartz, glass or ceramic if electrical isolation between the plates is required or it may be a conductor such as stainless steel. In either case the spacer can be bonded to the plates by means of indium layers on the spacer and plate face. The exposed face within the ring spacer is then electroded with a metal which contacts the indium bonding to allow electrical connection to be made to the face electrode. FIG. 2 shows the channel plates of FIG. 1 bonded together with an insulating ring spacer 11. The spacer 11 may be 50 to 200 microns thick. Both faces of the spacer are coated with indium as are the opposite parts of the channel plate faces. The parts of the channel plate faces inside the ring are electroded with a metal contacting the indium coating and the assembled stack of plates and spacer bonded together in the manner described above with reference to FIG. 1. At the junction between the spacer and each plate suitable indium coated shims (not shown) are provided having electrical connection tabs 23 and 25 brought out to terminals 21 and 22 respectively.

The spread of the electron stream issuing from one channel now increases the proportion of electrons which enter channels in the second plate. Also, for improved mechanical strength, the rims of the channel plates may be of solid glass to which the spacer is then bonded. The spacer may be metallic in the event that electrical isolation between the plates is not required. With an insulating spacer as shown in FIG. 2 an electric potential can be established between the two opposed faces of the plates to accelerate electrons issuing from the first plate. On striking the second plate on the channel ends or lands, secondary electrons are generated, a proportion of which will be drawn into the channels of the second plate, improving the electron coupling between the plates. In particle or photon counting applications, the spread of currents in the channels in the final plate due to a single point source event at the input plate allows computer localisation of the position of the event, thus effectively restoring a part of the original event resolution. Alternatively, a reverse bias of 200 to 300 volts may be applied between the opposed faces. This has the effect of filtering out low velocity electrons issuing from the first plate and reduces image degradation in some applications.

FIG. 3 shows a photon counting apparatus including a bonded stack of three channel plates. A photocathode 12 is shown on the inside of a transparent input window 13 of a vacuum envelope 14. A stack 16 of 3 channel plates is mounted with its input face 17 close to photocathode 12 and a fluorescent screen anode 18 is placed close to the output face 19. Adjacent channel plates of the stack have their channels at an angle to one another, three plates being employed in this case to further reduce optical and ion feedback in this apparatus which is intended to work at a sufficiently high gain that individual photons are detectable. In typical operation 1000 volts is applied between photocathode 12 and input face 17, 2000 to 3000 volts is applied across the bonded stack and 5000 volts is applied between anode 18 and output face 19. Anode 18 may be imaged on a television camera, not shown, the video waveform of which may be computer analysed to detect photon events.

Particle counting apparatus is very similar to the FIG. 3 apparatus except that the photocathode is absent and provision is made for the particles to be incident directly on the input face 17 where secondary electrons are generated and drawn into and along the multiplier channels. In earth satellite applications, no vacuum envelope is required. Particles from space are then incident directly on the input face.

FIG. 4 shows the present invention applied in a flat cathode ray display tube of the type disclosed in British patent specification No. 210396A (PHB32794). A low voltage, low current electron beam 41 is produced by an electron gun 26 and passed upwards through a field free region established between a divider 40 and the rear wall 43 of the envelope. Line deflection means 42 are provided in the region between the divider 40 and the rear wall 43. The divider 40 does not extend the full height of the envelope and in the space provided the electron beam is reflected through 180 degrees using a trough shaped electrode 44 which is at a low voltage, for example zero volts, relative to the final anode voltage, for example 400 V, of the electron gun 26. As the electron beam 41 follows a trajectory between the divider 40 and a glass channel plate electron multiplier 20 it is deflected towards the electron multiplier 20 by means of a field created between a number of substantially horizontal electrodes 46 provided on the divider 40. After current multiplication, the electron beam leaving each channel of the electron multiplier is subjected to an accelerating field to produce the required light output from the cathodoluminescent screen 24 carried by the transparent faceplate 45 of the envelope.

The electron multiplier 20 comprises a glass matrix channel plate electron multiplier having two channel plates 50 and 51 bonded in series. The diameters of the channels of plates 50 and 51 are typically those described with reference to FIG. 1, plates 1 and 8 respectively. A substantially continuous electrically conducting film 48 is provided over the input side of the electron multiplier 20.

In operation the conductive film 48 is at the voltage of the final anode of the electron gun 26 for example 400 volts and the voltages applied to the electrodes 46 are adjusted so that a repelling field is provided to deflect the beam towards the current multiplier, this deflecting field is formed by increasing the voltage on each of the electrodes 46 from zero volts to 400 volts in a specially timed sequence. 2000 volts is applied across the channel plate stack and a further 3000 volts between the stack and the screen 24 to produce an intensified raster on screen 24.

From reading the present disclosure, other modifications will be apparent to persons skilled in the art. Such modifications may involve other features which are already known in the design, manufacture and use of channel plate electron multipliers and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. A particle counting apparatus comprising a stack of glass channel electron multiplier plates, conductive electrodes provided on end faces of the stack between which a potential difference can be applied, an anode adjacent an output end face of the stack to collect electrons issuing from the channels, means for directing the particles to be counted onto the stack input end face, characterised in that the stack of glass channel plates are bonded together by a layer of indium on opposed faces of adjacent channel plates, said layer penetrating into said channels and forming a coating on the interior walls thereof.

2. The particle counting apparatus of claim 1 wherein said layer penetrates into said channel a distance approximately equal to the diameter of said channel.

3. A photon counting apparatus comprising a stack of glass channel electron multiplier plates, conductive electrodes provided on end faces of the stack between which a potential difference can be applied, an anode adjacent an output end face a photocathode adjacent an input end face of the stack for supplying electrons to the input end face in response to photons incident on the photocathode, characterised in that the stack of glass channel plates are bonded together by a layer of indium on opposed faces of adjacent channel plates, said layer penetrating into said channels and forming a coating on the interior walls thereof.

4. The photon counting apparatus of claim 2 wherein said layer penetrates into said channel a distance approximately equal to the diameter of said channel.

5. A cathode ray picture display tube comprising a glass channel electron multiplier plate, conductive electrodes provided on an input end face and an output end face of the multiplier plate between which a potential difference can be applied, means for scanning an electron beam across the input end face to generate a picture raster, and a phosphor screen adjacent the output end face to receive a multiplied electron picture raster, characterised in that the glass channel electron multiplier plate comprises a stack of multiplier plates bonded together by a layer of indium on opposed faces of adjacent channel plates, said layer penetrating into said channels and forming a coating on the interior walls thereof.

6. The cathode ray picture display tube of claim 5 wherein said layer penetrates into said channel a distance approximately equal to the diameter of said channel.

* * * * *